(12) United States Patent
Stelzer et al.

(10) Patent No.: US 9,617,080 B2
(45) Date of Patent: Apr. 11, 2017

(54) CENTRAL BELT SYSTEM OF A COMMISSIONING UNIT

(71) Applicant: Knapp AG, Hart bei Graz (AT)

(72) Inventors: Peter Stelzer, Gratkorn (AT); Franz Mathi, Gleisdorf (AT)

(73) Assignee: Knapp AG, Hart bei Graz (AT)

( * ) Notice: Subject to any disclaimer, the term of this patent is extended or adjusted under 35 U.S.C. 154(b) by 0 days.

(21) Appl. No.: 14/388,076

(22) PCT Filed: Mar. 7, 2013

(86) PCT No.: PCT/EP2013/000666
§ 371 (c)(1),
(2) Date: Sep. 25, 2014

(87) PCT Pub. No.: WO2013/143648
PCT Pub. Date: Oct. 3, 2013

(65) Prior Publication Data
US 2015/0136570 A1    May 21, 2015

(30) Foreign Application Priority Data

Mar. 28, 2012 (DE) .......................... 10 2012 006 150

(51) Int. Cl.
*B65G 43/00* (2006.01)
*B65G 43/08* (2006.01)
*B65G 1/137* (2006.01)
(52) U.S. Cl.
CPC .............. *B65G 43/08* (2013.01); *B65G 1/137* (2013.01); *B65G 1/1373* (2013.01); *B65G 2203/041* (2013.01)

(58) Field of Classification Search
CPC ....... B65G 43/08; B65G 1/137; B65G 1/1373
USPC .................................................. 700/225–230
See application file for complete search history.

(56) References Cited

U.S. PATENT DOCUMENTS 3,223,225 A * 12/1965 Clark ................... B65G 47/681
198/357
3,313,449 A * 4/1967 Parks ....................... B65G 1/08
186/55
5,271,703 A * 12/1993 Lindqvist ............... G06Q 10/08
186/55

(Continued)

FOREIGN PATENT DOCUMENTS

WO     98/47790 A1    10/1998
WO     03/033381 A1    4/2003

(Continued)

*Primary Examiner* — William R Harp
(74) *Attorney, Agent, or Firm* — McGlew and Tuttle, P.C.

(57) ABSTRACT

In the case of a central belt system (1) with article shafts (2), ejectors (5), moving central belt (4) and central control unit (6), an automatic control system (7') which is connected to the control unit (6) for articles to be controlled on the moving central belt (4), with a connected image processing unit (8), and a camera system (9, 10) possibly in addition with an illumination system (11). The camera and illumination systems (9, 10) are set in such a way, and the articles to be controlled which are arranged chaotically on the central belt (4) are ejected by the ejectors (5) in such a way, that optical shadow formation at the article to be controlled on the central belt (4) is preferably just prevented.

19 Claims, 5 Drawing Sheets

(56) References Cited

U.S. PATENT DOCUMENTS

| | | | | |
|---|---|---|---|---|
| 5,755,552 A | * | 5/1998 | Iwasaka | B65G 1/1376 198/418 |
| 6,540,062 B2 | * | 4/2003 | Wunscher | B65G 1/1373 198/395 |
| 8,201,681 B2 | * | 6/2012 | Schiesser | B65G 43/08 198/460.1 |
| 8,682,480 B2 | * | 3/2014 | Freudelsperger | B65G 47/519 198/358 |
| 8,868,232 B2 | * | 10/2014 | Freudelsperger | B65G 1/1378 141/82 |
| 2002/0063036 A1 | | 5/2002 | Wunscher et al. | |
| 2008/0183326 A1 | | 7/2008 | Danelski | |
| 2011/0170998 A1 | | 7/2011 | Winkler | |
| 2012/0004763 A1 | | 1/2012 | Freudelsperger | |

FOREIGN PATENT DOCUMENTS

| | | |
|---|---|---|
| WO | 2010/022832 A1 | 3/2010 |
| WO | 2010/099874 A1 | 9/2010 |

\* cited by examiner

CENTRAL BELT SYSTEM OF A COMMISSIONING UNIT

CROSS REFERENCE TO RELATED APPLICATIONS

This application is a United States National Phase Application of International Application PCT/EP2013/000666 filed Mar. 7, 2013 and claims the benefit of priority under 35 U.S.C. §119 of German Patent Application 10 2012 006 150.1 filed Mar. 28, 2012, the entire contents of which are incorporated herein by reference.

FIELD OF THE INVENTION

The present invention pertains to a central belt system of a commissioning unit

BACKGROUND OF THE INVENTION

A conveyor belt being guided centrally is moving in the direction of the pull-off container handling system in a prior-art central belt system. The order containers are stopped in front of the central belt and are kept motionless for a certain time period such that all articles of the central belt, which are intended for a certain order, will drop into the container.

Articles are kept in article shafts arranged in an A-shaped pattern above the central belt. One ejector is provided per article shaft. The ejectors are activated by a central control unit in such a timely manner that all the articles that belong to one order are collected in an increasingly larger pile on the central belt moving past.

An ascending belt is occasionally connected at the end of the central belt. This is needed to lift articles onto the container handling system, which may be running at a greater height.

The central belt is moving at a speed of about 1 msec in the normal operating mode.

Image processing is already established in the quality control of manufacturing companies. For example, imprints on containers are thus checked for completeness, mechanical components are tested for manufacturing defects, etc. The objects to be checked may be stopped for checking or may even be checked during motion. However, it is always known where in space the property of the object to be checked is located. It follows from this for image processing that the resolution of the cameras being used, the working distance as well as the illumination can be considered to be constant parameters.

SUMMARY OF THE INVENTION

Based on the above-described state of the art, the object of the present invention is to provide a central belt system of the type described in the introduction, which permits a nearly 100% control of chaotically arranged articles directly at the system, namely, at the moving central belt, while having a simple design and simple control means.

The underlying object of the present invention is accomplished by a central belt system of the present invention.

The essence of the central belt system according to the present invention is that an automatic control system is provided for articles to be controlled on the moving central belt, which automatic control system is connected with the central control unit and with which an image processing unit is connected, and which is supplied with reliable data of separated articles to be controlled by a variably adjustable camera system, optionally with an additional, variably adjustable illumination system in the area of the end of the central belt, wherein the camera system and possibly the illumination system are set and configured and the articles to be controlled, which are arranged chaotically on the central belt, are ejected or transferred by the ejectors such that optical shadow formation at the article to be controlled on the central belt is preferably just prevented.

The time interval of the ejection times calculated by the automatic control system, at which ejection times the articles are ejected from the ejection shafts, is selected especially such that the articles will preferably come to lie on the central belt at just such a distance from each other that no optical shadow formation will occur.

High quality requirements for controlling articles are met by the present invention. Errors possibly caused by the commissioning system itself are recognized directly at the system. As a result, rising costs of error are avoided. Further, various types of information on articles, e.g., serial numbers, expiration dates and batch information, nature of the packaging, intactness of the packaging and possibly further quality features, can be reliably recognized due to the present invention.

Rather than forming small piles of articles, as is the case according to the state of the art mentioned in the introduction on the moving central belt, the articles are fed separated from one another according to the present invention, namely, in such a way that, on the one hand, all pieces of information of each and every article are visible for the camera system, but the articles are also not spaced excessively far part from one another in order not to require too much space on the moving central belt.

This is accomplished by the criterion according to the present invention, according to which shadow formation at the article to be controlled is just prevented. A shadow cast by a neighboring article on an article to be controlled is disadvantageous for making possible an optimal recognition of articles. Brightness is decisive for the good detection of the information on the article to be controlled.

The interval between the ejection times, which is calculated by the central belt control system, is consequently selected according to the present invention such that the articles come to lie at such a distance from one another that no optical shadow formation will occur. These distances depend on the physical dimensions of the articles. Core data of the articles present in the warehouse are specifically expanded by those of optical shadow formation. The central belt control system takes these data into account in calculating the ideal ejection times. As a result, it can be symbolically achieved that small articles can be ejected onto the central belt closer to one another than large articles, which cast larger shadows.

A combination with the previous ejection of articles on a pile and the specific separation of the articles that must be subjected to quality control is possible. The information needed for this decision is made available to the central belt control system from the higher-level management system or the central control unit.

Provisions are made, in particular, for also changing the speed of the central belt additionally or exclusively dynamically in order to ensure a variable distance between articles as a function of the shadow formation.

The ejection accuracy depends, furthermore, on the weight of the articles. The acceleration of the ejectors of the central belt is advantageously set such that the articles of the left-hand article shafts of the central belt system come to lie on the left at the central belt and the articles of the right-side article shafts of the central belt system come to lie on the right at the central belt.

A longitudinal web is preferably provided in the middle of the central belt in order to prevent ejected articles from sliding onto the respective other side with certainty.

Articles will frequently come to lie on the central belt such that the information (bar code, intactness, etc.) to be detected is located on the underside of the article. This information is therefore hidden by the central belt. Cameras are therefore installed and configured directly after the central belt preferably such that the information of the articles, which is located on the underside, is read when the articles, following a trajectory or sliding on an oblique plane, drop or slide into the order container or another pull-off system.

To ensure the intactness of packagings, various seals are checked for intactness according to a preferred variant of the present invention. Some of these seals are only visible in connection with a defined frequency of light and can thus be checked for their intactness.

Even though the articles will come to lie on the central belt in defined areas (within a known starting and end position at the central belt and at a defined distance from each other), the articles are, in turn, located chaotically within these areas. It may happen now in case of some orientations of the articles in relation to the camera system that a quality feature is detected by more than one camera. To make it possible to make a distinction in the image processing unit between whether only one article was detected several times or whether a plurality of articles were detected, the physical flow of all articles is preferably monitored and especially the physical flow of articles is monitored photographically. To make it possible to meet this requirement, two types of basic information must be sent to the image processing unit:

The position in space of the cameras in relation to one another

Taking the angles between the cameras into account, a distinction can thus be made between whether two different cameras monitor one object from the different perspective or whether there are a plurality of objects.

The speed of the central belt

Taking the speed into account, it will then also be possible to synchronize the cameras of the camera system, because the image processing unit can calculate the emergence of an article in a camera in advance if the same article is involved.

Another embodiment according to the present invention is characterized in that a physical empty space is recognized between two commissioning orders. The camera system can be used without additional infrastructure to recognize the area between two orders that is empty by definition at the central belt as being physically empty. It is thus ensured that the ejector of the central belt system has not performed an ejecting motion incorrectly without an order or that an article has not come to lie in an unallowed area of the central belt by "jumping to the wrong place."

Provisions may also be made for recording in a central belt system only the data stream of one commissioning order from the camera of the camera system that is the first to recognize the data stream, because it is advantageous, to make it nevertheless possible to carry out the checking of the correctness of a commissioning order afterwards, to record the data stream of the camera system, which data stream was responsible for the finding of the quality feature (bar code, intactness, etc.), for a later use. The amount of memory needed drops to the data stream of one camera due to the selection of the data streams.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 5:
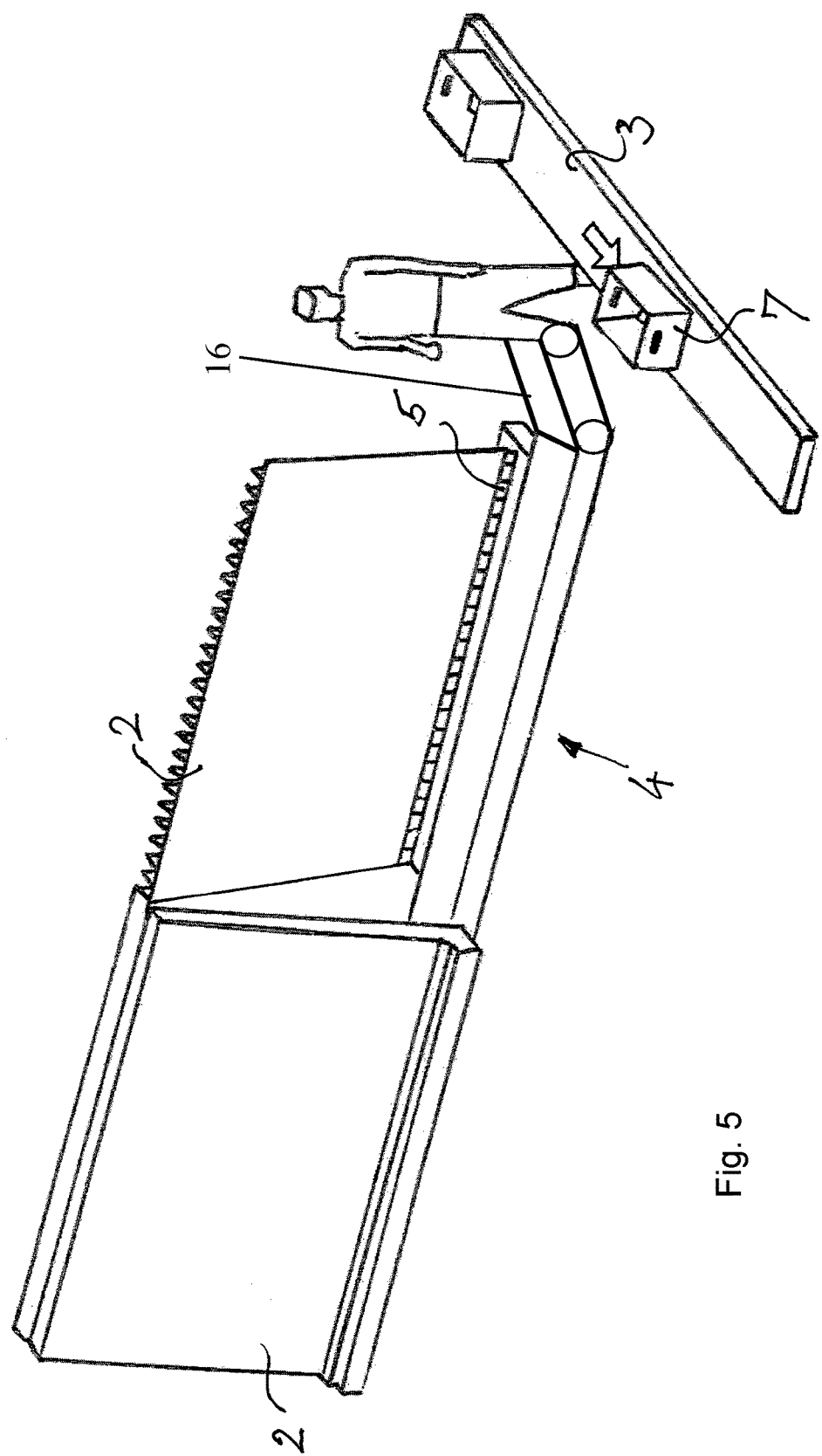
FIG. 5 is a schematic perspective cut-away view of a central belt system that is the same as the central belt system shown in FIG. 1 except that the central belt system includes an ascending belt.

According to the drawings, a central belt system 1 of a commissioning unit has article shafts 2 arranged in an A-shaped pattern with a central belt 4, which is arranged between them on the bottom side and whose conveying direction points in the direction of a transversely extending pull-off container handling system 3, wherein ejectors 5 of the article shafts are activated by a central control unit 6 in such a timely manner that all the articles that belong to one commissioning order are collected on the central belt in a virtual window and are released, possibly via an intercalated ascending belt, into an associated order container 7 of the container handling system. As shown in FIG. 5, the central belt 4 may include an ascending belt 16.

An automatic control system 7', which is in connection with the central control unit 6, is provided with an image processing unit 8 for articles to be controlled on the moving central belt 4, wherein said image processing unit 8 is supplied with reliable data of the articles to be controlled by a variably adjustable camera system 9, 10 additionally having a variably adjustable illumination system 11 in the area of the end of the central belt.

The camera system 9, 10 and the illumination system 11 are set and the articles to be controlled, which are arranged chaotically on the central belt 4, are ejected by the ejectors 5 such that mutual optical shadow formation of adjacent articles on the central belt 4 is just prevented.

In particular, the time interval of the times at which the articles are ejected from the ejection shafts 2, which times are calculated by the automatic control system 7', is selected such that the articles will come to lie on the central belt 4 at such a distance d from one another that no optical shadow formation will occur.

The speed of conveying of the central belt 4 can be changed additionally or exclusively dynamically in order to ensure a variable distance between articles as a function of the shadow formation.

Figure 4:
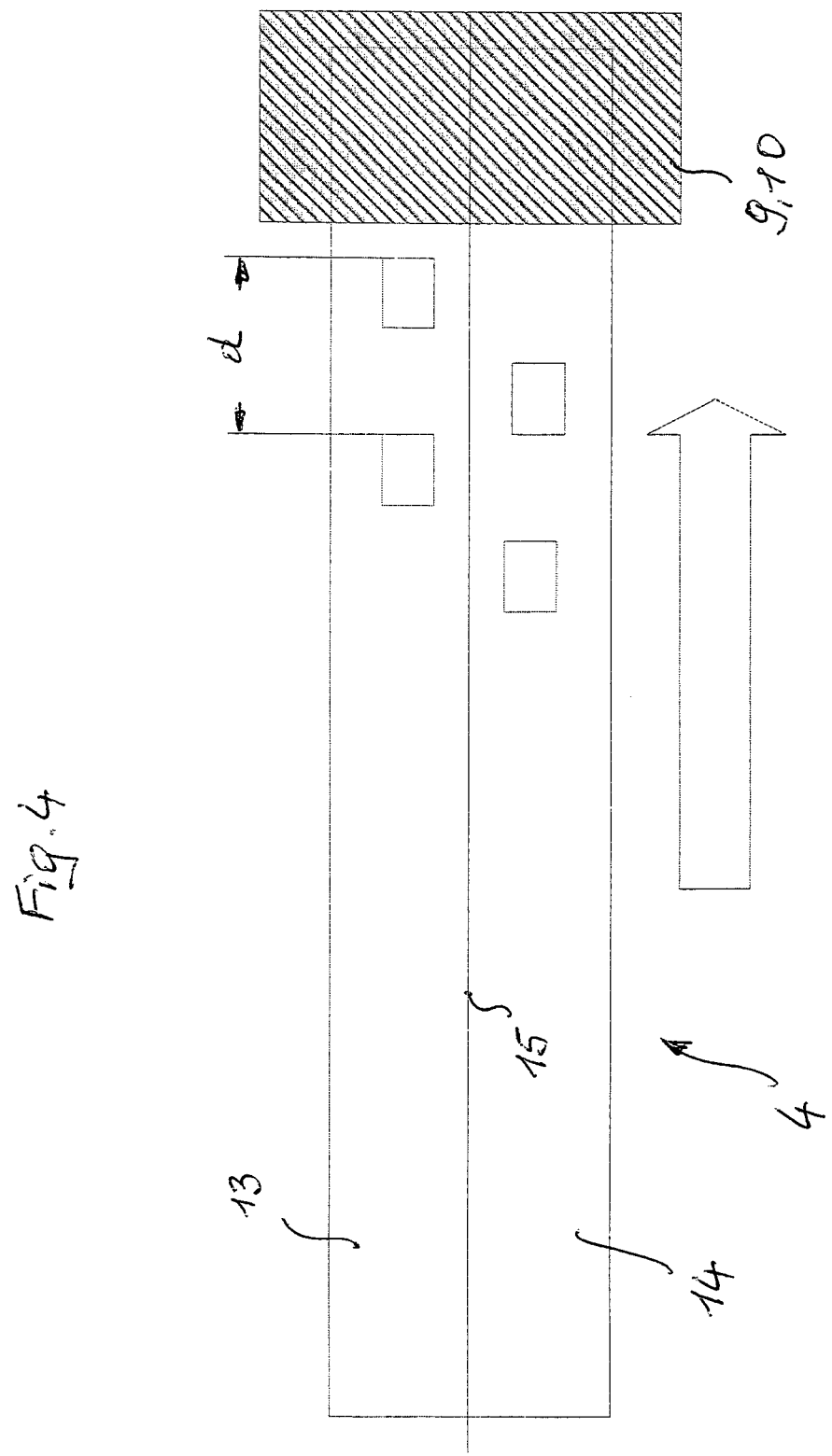
FIG. 4 is a schematic top view of another alternative detail of the central belt.

The acceleration of the ejectors 5 is set such that the ejected articles of one row of article shafts in a virtual window will come to lie in a virtual window of one half 13 of the central belt, which said window facing that shaft row, and the ejected articles of the opposite row of article shafts will come to lie in a virtual window of the other half 14 of the central belt, which latter window is located opposite this row, as this appears from FIG. 4, namely, preferably such that the individual ejected articles of one row of shafts will come to lie staggered on the central belt in relation to the individual ejected articles of the other row of shafts. Mutual shadow formation is prevented due to the staggered arrangement.

According to the embodiment shown in FIG. 4, a longitudinal web 15 is optionally located in the middle of the central belt 4 (depending on whether this is required by the properties of the articles) in order to prevent ejected articles from sliding to the respective other longitudinal side of the central belt with certainty.

Figure 1:
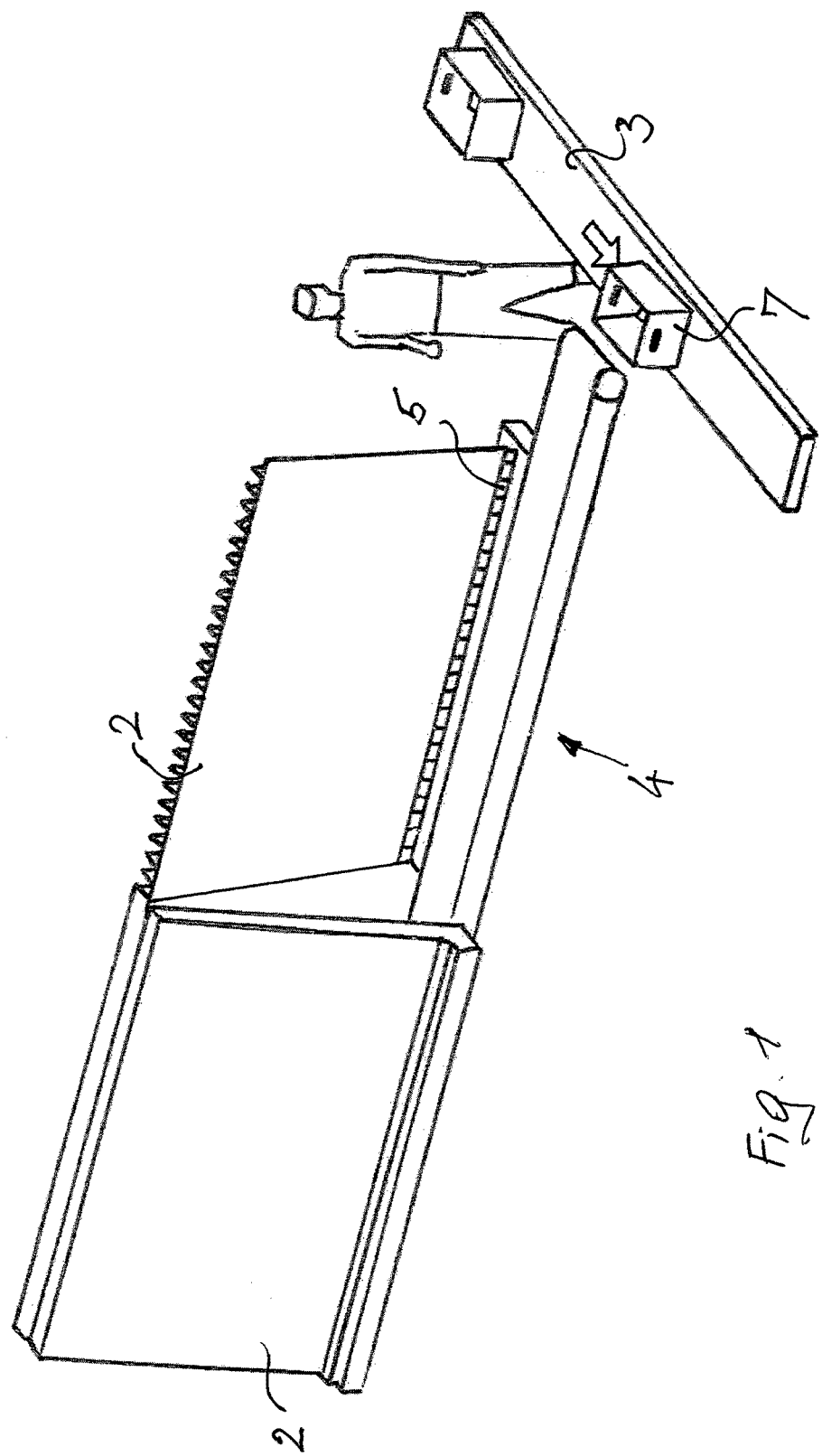
FIG. 1 is a schematic perspective cut-away view of a central belt system of a commissioning unit of the present invention.
Figure 2:
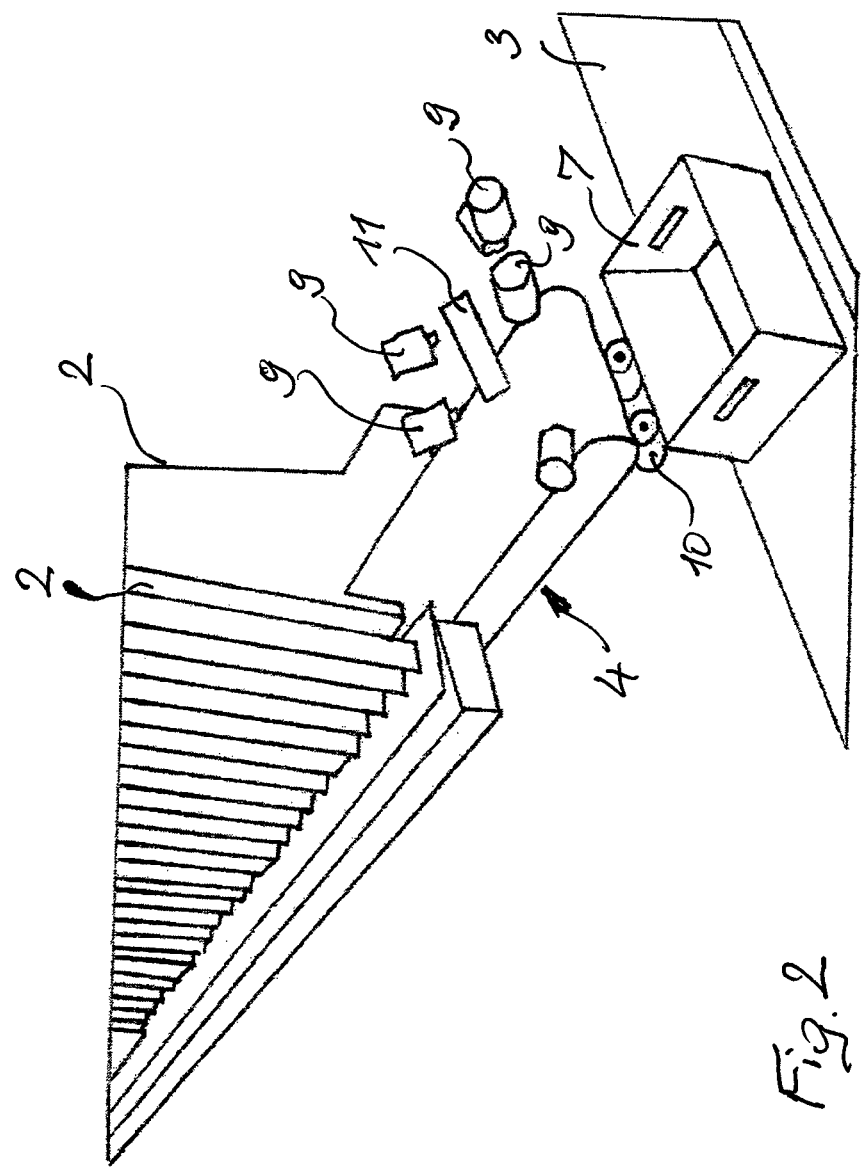
FIG. 2 is an enlarged view of the central belt system according to FIG. 1 with camera unit and illumination unit.
Figure 3:
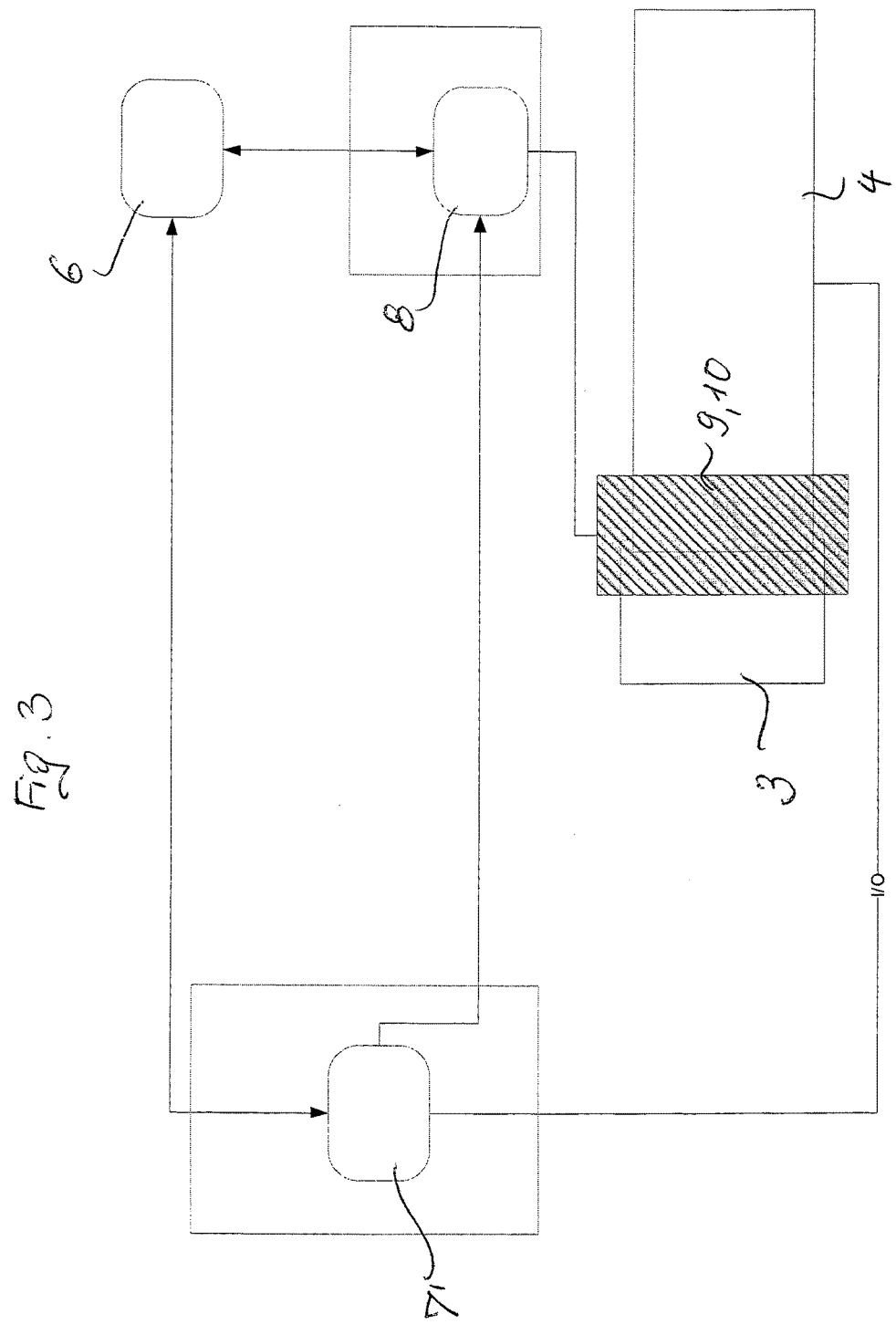
FIG. 3 is a schematic view of the circuitry of the central belt system according to FIGS. 1 and 2 with a central belt, a camera system, a central control unit and an automatic control system.

According to the embodiment according to FIG. 2, cameras 10 of the camera system 9, 10 are installed and configured directly after the central belt 4 such that the information on the articles, which is located on the underside, can be read when the articles drop, following a trajectory, into the positioned order container 7, which is provided on the pull-off container handling system 3.

Instead of on a trajectory, the articles may slide into the order container 7 on an oblique plane.

The packaging of the articles is checked by checking various seals for their intactness with the use of a defined frequency of light.

The physical flow of articles is monitored photographically.

Recognition of a physical empty space between two commissioning orders is performed as well.

Only the data stream of a commissioning order from the camera of the camera system 9 that has recognized the data stream is recorded.

The technical system has specifically the following design:

A variable number of cameras 9, 10 are mounted at the end of the central belt 4 such that they can record the data to be detected. The challenge is now that the exact position of the article on the central belt is not known. Furthermore, it is not known where the information to be checked is arranged on the article.

The detection of a data matrix bar code can be imagined here for simplicity's sake. However, the solution described is more comprehensive. It is also possible to detect the intactness of a packaging.

To make it now possible to detect the data matrix bar code, the following shall be ensured:

The distance d between the articles on the central belt 4 must be slightly increased. In particular, it must be guaranteed that the distance d between the articles is selected to be such that the optical shadows formed do not prevent the detection of the bar code of an article following that article.

It may occasionally happen that the article comes to lie on the central belt 4 such that its bar code is hidden by the central belt 4 itself. It is therefore advantageous to also arrange cameras 10 at the end of the central belt such that the bar code can be read during the brief time window during which an article, following a trajectory (or sliding on an oblique plane), drops into the order container. The order container may be a container on the handling system or a filling hopper or an alternative pull-off unit, e.g., another belt system.

Parameters:

The moving articles are to be detected by means of the cameras such that clear, unblurred images will enter the image processing unit 8.

The illumination system 11 shall be made so variable that the correct frequency spectrum is sent depending on the information to be detected (bar code, intactness, nature of the packaging, etc.). Thus, possible damage to a seal can be recognized in a certain frequency spectrum only (as in the case of, e.g., checking a bill under UV light).

Both the number and the geometric arrangement of the cameras as well as the optical adjustment thereof in terms of depth of field and focus are very complex within the framework of this task. To make it possible to guarantee the putting into operation at the location of a user of the central belt system with acceptable effort, a self-test process is integrated in the technical system. The self-test process provides for placing a calibrated reference object (e.g., a cube with known dimensions and defined imprint) into the field of view of the technical system for the first configuration. Via the image processing unit 8, the image information of every individual camera is now tested in order to ensure that the geometric arrangement, depth of field and focus are set correctly. In case of an incorrect configuration, the person performing the putting into operation is prompted by the image processing unit 8 optically and acoustically to perform the indicated adjustments, and the illumination system 11 will activate its different frequency spectra one after another in order to ensure that the image information of the calibrated reference object can be detected.

After the calibration has been performed, a structured light is projected by the technical system onto the central belt. The cameras of the camera system record this structured information and store the results in the image processing unit 8. The structured light is not projected during the normal operation. The structured light is projected again and detected by the camera system during defined self-test phases. The comparison with the reference data being stored provides information on whether trouble-free operation is possible and is used as a basis for decision for status reports of the technical system. The system is stopped depending on the status report, and a report is sent to the system 6.

The mode of operation will be described below.

A data processing system in the form of a central control unit 6, which controls the flow of goods in a warehouse and manages the inventory data in the warehouse—occasionally this is a system, and these functions are performed in other cases by two separate systems—transmits during the operation one or more orders to the control system 7' of the central belt system 1. This system processes the orders such that articles are ejected from the shafts 2 onto the central belt 4 at the correct time. The control system of the central belt 4 knows the first and last physical positions at the central belt 4, which belong to this order, and sends these positions to the control system of the image processing unit 8. The image processing unit 8 receives the image data from the camera system 9, 10, decodes the data and states (bar code, nature of the packaging, count, intactness of the packaging, etc.) required for quality assurance, assigns these to the order sent by the control system of the central belt 4, and reports the decoded information read back to same. The qualitative decision on whether the sent order data agree with the read data required for quality assurance is the responsibility of the control system of the central belt 4. It is the responsibility of the control system\of the central belt 4 to make the decision itself or to delegate it again to the higher-level data processing system, the central control unit 6.

A heartbeat signal in the millisecond cycle is continuously exchanged during the operation between the central belt control system 7' and the image processing unit 8. It is thus ensured that the image processing unit 8 is in operation and the data link between the image processing unit 8 and the central belt control system 7' is functioning properly.

Run-Up Phase:

The camera system 9, 10 performs a self-test during the run-up phase by projecting a structured light onto the empty surface of the central belt. The projection is detected by the cameras by optical technology and compared with the data being stored in the image processing unit 8. If there is no or only a slight difference in the image data (the value of the agreement can be set by the user), the system is considered to be calibrated and can start its operation.

Thus, a nearly 100% control is possible at the moving central belt due to the present invention, especially by minimizing the distance depending on the geometry of the articles and the camera position, detecting the underside of the articles, the possibility of self-testing with a calibrated reference object (illumination, depth of field, camera position), double reading of a code: The flow of products is monitored photographically for complaints: Only the data stream from the camera that recognized the code is stored.

While specific embodiments of the invention have been shown and described in detail to illustrate the application of the principles of the invention, it will be understood that the invention may be embodied otherwise without departing from such principles.

The invention claimed is:

1. A central belt system of a commissioning unit, with article shafts and a central belt moving in a direction of a pull-off container handling system, the article shafts including ejectors, wherein ejectors of the article shafts are activated in such a timely manner that all the articles that belong to one commissioning order are collected on the central belt in a virtual window and are released into an associated order container of the container handling system, the central belt system comprising:

an automatic control system, which is in connection with the moving central belt, with a connected image processing unit is provided for the articles to be controlled on the moving central belt, wherein said image processing unit is supplied with reliable data of articles by a variably adjustable camera system, wherein the articles to be controlled, which are arranged on the central belt, are ejected or transferred by the ejectors via said automatic control system such that optical shadow formation on the central belt is prevented, said camera system comprising a plurality of cameras, said plurality of cameras capturing data of the arranged articles on the central belt, wherein the articles are illuminated by an illumination system.

2. A central belt system in accordance with claim 1, wherein an interval of times at which the articles are ejected from the article shafts, which times are calculated by the automatic control system, is selected to be such that the articles come to lie on the central belt at such a distance from each other that no optical shadow formation occurs, said automatic control system receiving said data regarding said arranged articles, said data comprising dimensions of the arranged articles, said automatic control system comparing said data regarding said arranged articles with a placed order, said automatic control system controlling said ejectors based on said data, said automatic control system receiving predetermined data of articles that belong to one commissioning order and said automatic control system comparing said predetermined data of articles with said reliable data of the articles from said image processing unit to determine if the one commissioning order has been fulfilled.

3. A central belt system in accordance with claim 1, wherein a speed of conveying of the central belt is changed in order to ensure a variable distance between articles depending on the shadow formation.

4. A central belt system in accordance with claim 1, wherein an acceleration of the ejectors is set such that ejected articles of one row of article shafts come to lie in a virtual window of one half of the central belt, which said window faces the one row of article shafts, and the ejected articles of an opposite row of article shafts located opposite come to lie in another virtual window of another half of the central belt, said another virtual window facing said opposite row of article shafts.

5. A central belt system in accordance with claim 4, wherein a longitudinal web is arranged in a middle of the central belt in order to prevent ejected articles from sliding to a respective other longitudinal side of the central belt with certainty.

6. A central belt system in accordance with claim 1, wherein cameras of the camera system are installed and configured directly after the central belt such that said data of the articles, which is located on an underside of the articles, is read when the articles, following a trajectory or sliding on an oblique plane, drop or slide into the order container or another pull-off system, said automatic control system receiving said data regarding said arranged articles, said data comprising dimensions of the arranged articles, said automatic control system comparing said data regarding said arranged articles with a placed order, said automatic control system controlling said ejectors based on said data.

7. A central belt system in accordance with claim 1, wherein checking of the articles is performed by checking various seals for intactness with use of a defined light frequency.

8. A central belt system in accordance with claim 1, wherein a physical flow of articles is monitored photographically.

9. A central belt system in accordance with claim 1, wherein recognition of a physical empty area between commissioning orders is performed.

10. A central belt system in accordance with claim 1, wherein only a data stream of a commissioning order from a camera of the camera system that was a first to recognize the data stream is recorded.

11. A central belt system in accordance with claim 1, wherein the article shafts are arranged in an A-shaped pattern.

12. A central belt system in accordance with claim 1, wherein the articles are released via an intermediary of an ascending belt.

13. A central belt system in accordance with claim 1, wherein said variably adjustable camera system comprises said illumination system, said illumination system being variably adjustable, said illumination system being arranged in an area of the central belt.

14. A central belt system in accordance with claim 13, wherein the illumination system is set and configured such that the optical shadow formation on the central belt is prevented.

15. A central belt system of a commissioning unit, comprising:
- article shafts and a central belt moving in a direction of a pull-off container handling system, said article shafts comprising ejectors;
- a central control unit, said ejectors being activated via said central control unit such that all articles associated with one commissioning order are collected on the central belt in a virtual window and released into an associated order container of the container handling system;
- an automatic control system connected with the moving central belt and said central control unit;
- a variably adjustable camera system comprising a plurality of cameras and a variably adjustable illumination system, said plurality of cameras capturing data of the articles, wherein the articles are illuminated via said variably adjustable illumination system; and
- an image processing unit connected to said automatic control system, said image processing unit receiving said data of the articles via said variably, adjustable camera system, said automatic control system determining ejection times at which the articles are ejected from said ejection shafts, said central control unit receiving said ejection times as input, wherein the ejectors are controlled via at least said central control unit based on said ejection times such that optical shadow formation on the central belt is prevented.

16. A central belt system in accordance with claim 15, wherein an interval of times at which the articles are ejected from the article shafts, which times are calculated by the automatic control system, is selected to be such that the articles come to lie on the central belt at such a distance from each other that no optical shadow formation occurs, said automatic control system receiving said data of said articles, said data comprising dimensions of the articles, said automatic control system comparing said data regarding said articles with a placed order, said automatic control system controlling said ejectors based on said data.

17. A central belt system in accordance with claim 15, wherein a speed of conveying of the central belt is changed in order to ensure a variable distance between articles depending on the optical shadow formation.

18. A central belt system in accordance with claim 15, wherein an acceleration of the ejectors is set such that ejected articles of one row of article shafts are arranged in a virtual window of one half of the central belt, said window facing in a direction of the one row of article shafts, wherein other ejected articles of an opposite row of article shafts are ejected such that said other ejected articles are arranged in another virtual window of another half of the central belt, said another virtual window facing in a direction of said opposite row of article shafts, said automatic control system receiving said data of said articles, said data comprising dimensions of the articles, said automatic control system comparing said data regarding said articles with a placed order, said automatic control system controlling said ejectors based on said data, wherein a longitudinal web is arranged in a middle area of the central belt in order to prevent ejected articles from sliding to a respective other longitudinal side of the central belt.

19. A central belt system in accordance with claim 15, wherein said cameras of the camera system are installed and configured directly after the central belt such that said data of the articles, which is located on an underside of the articles, is read when the articles, following a trajectory or sliding on an oblique plane, drop or slide into the order container or another pull-off system, said automatic control system receiving predetermined data of articles that is associated with said one commissioning order and said automatic control system comparing said predetermined data of articles with data of the articles captured via said plurality of cameras to determine if the one commissioning order has been fulfilled.

* * * * *